Dec. 4, 1962 R. SCHWING 3,066,942
SEALING RING ASSEMBLY
Filed Sept. 17, 1959
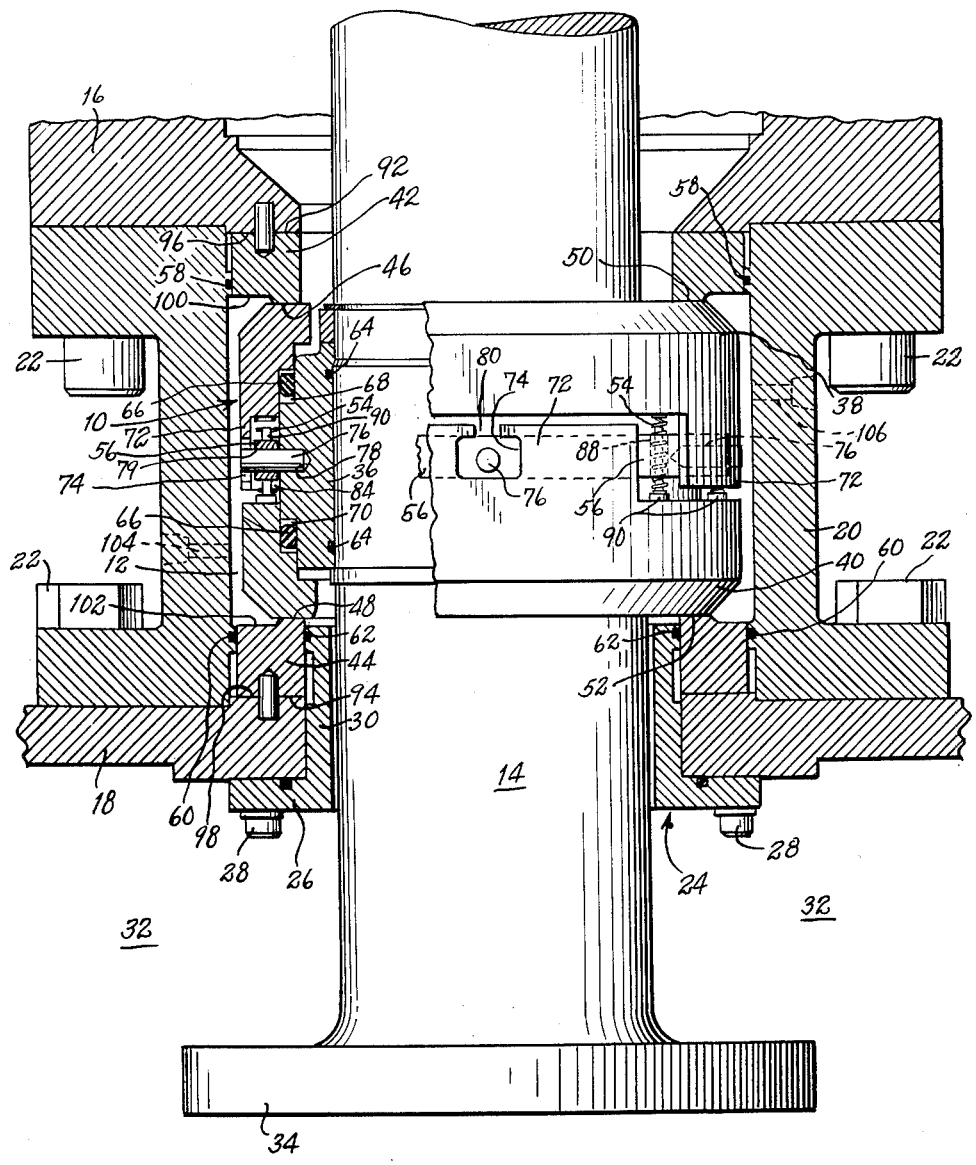
INVENTOR:
ROGER SCHWING
BY Robert Henderson
ATTORNEY United States Patent Office 3,066,942
Patented Dec. 4, 1962

3,066,942
SEALING RING ASSEMBLY
Roger Schwing, Palmyra, N.Y., assignor to Garlock Inc., a corporation of New York
Filed Sept. 17, 1959, Ser. No. 840,612
4 Claims. (Cl. 277—62)

This invention relates to sealing devices for use in machinery, for sealing shafts, rods or the like against leakage of fluid therealong. More particularly, it relates to improved mounting means for one or more sealing rings.

An important object of this invention is the provision of means in a sealing device for so supporting a sealing ring, which is axially subjected to high fluid pressure and/or a heavy thrust load, that the sealing ring will not become materially deformed by such pressure and/or load and thereby have a sealing surface thereon rendered incapable of maintaining a satisfactory sealing effect.

Another important object is the provision of an improved mounting arrangement for a pair of oppositely facing sealing rings by means of which the two sealing rings are urged apart to a limited extent, are linked together against separation, are constrained to turn with each other, and are constrained to turn with a related sleeve by means of which said rings are mounted upon a shaft or equivalent rotary member.

The foregoing and other objects are achieved by this invention of which a preferred embodiment is shown, for illustrative purposes, in the accompanying drawing, which is a central axial view, partly in section and partly in elevation, of the mentioned embodiment, shown in association with portions of a shaft and a related machine casing.

A seal embodying this invention is particularly useful or desirable in sealing a shaft or the like against leakage therealong of fluid under very substantial pressure. The fluid sealed may be either a liquid or a gas; gas being mentioned herein, for illustrative purposes, as the sealed fluid and liquid being mentioned for cooling and sealing purposes.

The seal, generally indicated at 10, is disposed within an annular space or area 12 defined by a rotary shaft 14, spaced casing walls 16 and 18 suitably apertured to receive the shaft therethrough, a collar 20 fixed by screws or bolts 22 to and between the walls 16 and 18, and a sleeve 24 having a flange 26 by which it is fixed, with screws 28, to the wall 18, and a cylindrical portion 30 which extends within the aperture provided for the shaft in wall 18, and inwardly beyond the latter wall in relation to the area 12. In one manner of usage, the casing wall 18 would constitute an upper wall defining a mixing chamber 32; and a mixing element (not shown) or other instrumentality for treating matter within the chamber 32 would be suitably fixed upon mounting flange 34 provided at the lower end of the shaft.

The principal parts of the illustrated seal 10 are a sleeve 36 which fits closely upon shaft 14 and is suitably keyed to the latter to turn therewith, rigid, oppositely facing, rotary sealing rings 38 and 40 which turn with the shaft 14 and sleeve 36, and rigid, stationary sealing rings 42, 44, disposed at opposite ends of the area 12, and having annular sealing faces 46 and 48, respectively, which are in sliding sealing engagement with annular sealing faces 50, 52 on the rotary sealing rings 38 and 40; the latter engagement being maintained, at least in part, by a circular series of compressed springs 54 which are disposed in a spring-holding ring 56 and urge the rotary rings 38 and 40 away from each other and against the stationary rings 42 and 44.

Ring 44 cooperates with rotary sealing ring 40 to seal fluid in mixing chamber 32, which fluid, for example, may be a gas in said chamber, possibly emanating from material being mixed in said chamber. Pursuant to rather common practice, the cooperating sealing faces 48 and 52 are lapped to enable them to work together efficiently to provide a good sealing effect. A suitable packing ring 58 is provided to afford a static seal between ring 42 and collar 20, and suitable packing rings 60 and 62, somewhat similarly, afford static seals between ring 44 and, respectively, the collar 20 and the cylindrical portion 30 of the sleeve 24.

Suitable packing rings 64, within and toward opposite ends of the seal's sleeve 36, effect a static seal between the latter and the shaft 14; and packing rings 66, preferably so-called O rings of rubber or rubber-like material, are disposed toward opposite ends of the sleeve 36 in annular spaces 68, 70 between said sleeve and the rotary sealing rings 38 and 40. The just-mentioned spaces are defined by opposing outer annular rabbets on the sleeve 36 and inner annular rabbets in the sealing rings 38 and 40, and the mentioned O rings provide a somewhat shiftable seal between said sleeve and said rotary sealing rings.

The rotary sealing rings 38 and 40 may, advantageously, be alike and formed, at their adjacent inner ends, with integral, interdigitated, arcuate extensions 72; two of the latter being on each of the rotary sealing rings and spaced 180° apart on each ring in the illustrated embodiment. These extensions permit only rather limited, angular relative shifting of the two rotary sealing rings, but they also cooperate with other parts, as hereinafter explained, to constrain the said two rings to turn with the sleeve 36 and the shaft.

For the last-mentioned purpose, each of the extensions 72 is formed with an oblong slot 74 into each of which extends one of four similar radial pins 76 which are tightly fitted and held within equally spaced radial bores 78 in the sleeve 36 and, also, extend through radial bores 79 in the spring-holding ring 56. Each slot 74 is formed with a mouth 80 which is slightly wider than the diameter of a related pin 76, so that, after the pins 76 have been fixed into the sleeve 36 in assembling the seal, the rings 38 and 40 may be moved axially inwardly against the force of the springs 54 to cause the pins 76 to enter said slots through the latters' mouths 80. Thereafter, a slight rotation of said rings relatively to the sleeve 36, permissible because the slots 74 are each considerably longer than the width of a pin 76, causes the rings 38 and 40 to be locked together and to said sleeve at least until the assembling of the seal in a related machine casing has been completed. The force of the springs 54, after the mentioned slight rotation of the rings 38 and 40, establishes a sufficient degree of friction between the pins 76 and the side surfaces of the mouth sides of the slots 74 to maintain the mentioned locked condition of said rings during further assembling of the seal.

The spring-holding ring 56 fits accurately about the sleeve 36 and is located in an annular space 84 within the extensions 72 of the two rotary sealing rings. In addition to the radial bores 79 through which the pin 76 extend to keep said ring from shifting relatively to said sleeve, the ring 56 is formed with a series of equidistant axially extending bores 88 through each of which extends one of the springs 54. Each of these springs has an axially extending pin 90 therewithin, of a diameter only slightly less than the internal diameter of the coils of said springs, to oppose any tendency of the springs to collapse or become deformed from their straight condition during assembing or as a result of being under compression. The described spring arrangement in which each spring 54 extends through its related bore 88, compressed between the two rotary sealing rings 38 and 40, gives assurance that the total force of said springs is perfectly equalized upon the two said rotary rings.

The mentioned spring-holding ring is put in place before the insertion of the pins 76, in assembling the parts of the seal. After insertion of the pins 76, one of the rotary sealing rings 38 or 40 with an O ring 66 therewithin is slid into place and locked to two of said pins in the manner already described. Then, the springs 54 with their pins 90 are inserted into bores 79 in the spring-holding ring, after which the other rotary sealing ring, with its O ring, is slid into place and locked to the other two of the pins 76.

The described locked condition of the rotary sealing rings to the pins 76 need not necessarily continue after installation of the seal in a machine, for then various related machine parts prevent dislocation of the seal's parts. Ordinarily, however, each pin 76, during operation, would seat in one end of its related slot 74 because of some friction drag upon the end sealing faces of the rotary sealing rings.

It has been discovered that under high fluid pressure and/or high thrust load operating conditions, lapping of the back flat surfaces 92 and 94, respectively, of stationary sealing rings 42 and 44 and/or lapping of the flat surfaces 96, 98 on which said rings seat permits satisfactory sealing at the sliding sealing faces 46, 48, 50 and 52 at the outer ends of the rotary sealing rings while objectionable leakage occurs at said sliding sealing faces if the surfaces 92, 94, 96, 98 are merely machined flat.

Although it is not necessary for present purposes that there be a clear understanding as to the reason for the mentioned successful result where the surfaces 92, 94, and/or the surfaces 96, 98 are lapped rather than merely machined, it appears that, where said surfaces are merely machined, the imposition of heavy fluid pressure upon surfaces 100 and 102 at the inner ends of the stationary sealing rings 42 and 44 or the imposition of any heavy axially directed thrust load upon said rings causes sufficient internal deformation of said rings that their sealing faces 46 and 48 also become deformed sufficiently to cause objectionable leakage thereacross.

Under heavy fluid pressure, roughness or irregularities in two contacting, flat, machined surfaces attempt to embed themselves into each other, leading to internal stresses and deformation which, in rings such as rings 42 and 44, extend to the sliding sealing faces 46 and 48, thereby causing leakage. Apparently the lapping of such contacting flat surfaces, rather than mere machining thereof, leaves no roughness or irregularities which would tend to become so embedded, and thereby avoids such deformation and leakage.

Using the seal and adjacent parts illustrated in the drawing as an example, gas within the mixing chamber 32 may be at a pressure of upward of 650 p.s.i. while a suitable liquid for sealing and cooling purposes, introduced into space 12 through inlet port 104 and exhausted therefrom through outlet port 106, may be at a pressure of upward of 700 p.s.i. The latter pressure is imposed directly upon surfaces 100 and 102 and, indirectly, through rings 38 and 40, upon faces 46 and 48 of the stationary sealing rings and, as a result, the latter rings and their sealing faces becomes deformed and leakage occurs.

It should be obvious that the present improved concepts of a sealing ring assembly may be utilized in various structures other than the structure illustrated and described herein without departing from the invention as set forth in the following claims.

I claim:

1. In a sealing device having a sleeve for affixation upon a shaft, and a pair of interlinked rotary sealing rings, sealed to said sleeve, constrained to turn with said sleeve and yieldably urged oppositely into sliding sealing engagement with annular surfaces of a machine casing through which said shaft extends; means for so interlinking said rings that they may be readily linked to said sleeve and to each other, said means comprising slots in said sealing rings each having a mouth opening rearwardly of the sealing ring in which it is located and narrower than the slot's circumferential dimension, and pins, thinner than the width of said mouths, fixed in said sleeve and extending radially outwardly into said slots; said sealing rings being axially movable relatively to said sleeve to cause said pins to enter said slots axially through their said mouths and being rotatable relatively to said sleeve to cause said pins to move in said slots into nonalignment axially of the slots' mouths, whereby to hold said sealing rings linked to said sleeve and to each other.

2. Interlinking means for a sealing device, according to claim 1, said sealing rings having interdigitated extensions, at their rear ends, and said slots being provided in said extensions.

3. In a sealing device having a sleeve for affixation upon a shaft, and a pair of rotary sealing rings, sealed to said sleeve, constrained to turn with said sleeve and yieldably urged oppositely into sliding sealing engagement with annular surfaces of a machine casing through which said shaft extends; spring means for thus yieldably urging said sealing rings, comprising a spring-holding ring extending about and fixed to said sleeve, plural axial bores extending completely through said spring-holding ring at spaced points therearound, and a single compressed coil spring in each of said bores, extending freely therethrough with its opposite ends extending therefrom into pressing engagement with radially extending surfaces of said sealing rings to yieldably urge the latter in opposite axial directions.

4. In a sealing device having a sleeve for affixation upon a shaft, and a pair of interlinked rotary sealing rings, sealed to said sleeve, constrained to turn with said sleeve and yieldably urged oppositely into sliding sealing engagement with annular surfaces of a machine casing through which said shaft extends; the combination of spring means for thus yieldably urging said sealing rings and means for so interlinking said rings that they may be readily linked to said sleeve and to each other, said spring means comprising a spring-holding ring extending about said sleeve, plural coil springs within circumferentially spaced axial bores in said spring-holding ring and extending from opposite sides of the latter into pressing engagement with radial surfaces of the two sealing rings, and plural pins fixed into said sleeve and extending radially through radial bores in said spring-holding ring to oppose movement of the latter ring relatively to said sleeve, and said means for interlinking said sealing rings comprising slots in said sealing rings each having a mouth opening rearwardly of the sealing ring in which it is located and narrower than the slot's circumferential dimension, and rigidly integral extensions of said pins, extending radially outwardly of said spring-holding ring into said slots; said extension being thinner than the width of said mouths, and said sealing rings being axially movable relatively to said sleeve to cause said pins to enter said slots axially through their said mouths and being rotatable relatively to said sleeve to cause said pins to move in said slots into non-alignment axially of the slots' mouths, whereby to hold said sealing rings linked to said sleeve and to each other.

References Cited in the file of this patent

UNITED STATES PATENTS

| | | |
|---|---|---|
| 2,306,417 | Wiessner | Dec. 29, 1942 |
| 2,723,868 | Hartranft | Nov. 15, 1955 |
| 2,836,440 | Brumagim | May 27, 1958 |
| 2,912,265 | Brummer | Nov. 10, 1959 |
| 2,922,668 | Haake | Jan. 26, 1960 |
| 2,971,784 | Tracy | Feb. 14, 1961 |